(12) United States Patent
Hodza

(10) Patent No.: US 10,131,008 B2
(45) Date of Patent: Nov. 20, 2018

(54) REAMING ELEMENT, REAMING TOOL AND METHOD FOR THE PRODUCTION THEREOF

(71) Applicant: KOMET GROUP GMBH, Besigheim (DE)

(72) Inventor: Erkan Hodza, Nuertingen (DE)

(73) Assignee: KOMET GROUP GMBH, Besigheim (DE)

( * ) Notice: Subject to any disclaimer, the term of this patent is extended or adjusted under 35 U.S.C. 154(b) by 0 days.

(21) Appl. No.: 14/777,676

(22) PCT Filed: Mar. 17, 2014

(86) PCT No.: PCT/EP2014/055286
§ 371 (c)(1),
(2) Date: Sep. 16, 2015

(87) PCT Pub. No.: WO2014/147017
PCT Pub. Date: Sep. 25, 2014

(65) Prior Publication Data
US 2016/0263685 A1    Sep. 15, 2016

(30) Foreign Application Priority Data
Mar. 18, 2013   (DE) .................. 10 2013 204 743

(51) Int. Cl.
*B23D 77/00* (2006.01)
*B23D 77/02* (2006.01)
*B24B 3/18* (2006.01)

(52) U.S. Cl.
CPC ............... *B23D 77/02* (2013.01); *B24B 3/18* (2013.01); *B23D 2277/10* (2013.01);
(Continued)

(58) Field of Classification Search
CPC ............... Y10T 408/89; Y10T 408/892; Y10T 408/8953; Y10T 408/896; Y10T 408/904;
(Continued)

(56) References Cited

U.S. PATENT DOCUMENTS 430,792 A * 6/1890 Taft ..................... B21K 1/74
                                                    72/371
599,537 A * 2/1898 Steudner ............... B23B 51/048
                                                    408/223
(Continued)

FOREIGN PATENT DOCUMENTS

CH         285540 A    9/1952
DE    44 05 749 A1     8/1995
(Continued)

OTHER PUBLICATIONS

JP 2003-340646 Machine Translation, pp. 3-7, dated May 9, 2017.*
(Continued)

*Primary Examiner* — Nicole N Ramos
(74) *Attorney, Agent, or Firm* — Flynn Thiel, P.C.

(57) ABSTRACT

A reaming element for a reaming tool capable of being driven to rotate about an axis of rotation for fine machining of a prefabricated bore, the reaming element having a front main cutting edge and a secondary cutting edge adjoining the radially outward end of the main cutting edge, wherein the main cutting edge and the secondary cutting edge delimit a chip-removing surface, and a polished chamfer, which forms a support zone for guidance on the wall of the bore, is formed between the secondary cutting edge and the rear flank face thereof. The support zone is smaller than the polished chamfer and is kept a lateral distance away from the secondary cutting edge by an intermediate part, more particularly, a recessed intermediate part of the polished chamfer.

6 Claims, 3 Drawing Sheets

(52) U.S. Cl.
CPC ...... *B23D 2277/14* (2013.01); *B23D 2277/36* (2013.01); *B23D 2277/62* (2013.01)

(58) Field of Classification Search
CPC ........... Y10T 408/9042; Y10T 408/909; Y10T 408/9095; Y10T 408/9097; Y10T 408/44; Y10T 408/455; B23B 51/00; B23B 51/02; B23D 2277/10; B23D 2277/14; B23D 2277/36; B23D 6277/02; B24B 3/18
USPC ................................................ 408/117–233
See application file for complete search history.

(56) References Cited

U.S. PATENT DOCUMENTS

| | | | | |
|---|---|---|---|---|
| 1,028,623 | A * | 6/1912 | Smith | B23B 31/201 |
| | | | | 279/20 |
| 3,759,625 | A | 9/1973 | Iversen | |
| 3,977,807 | A * | 8/1976 | Siddall | B23B 51/02 |
| | | | | 408/223 |
| 4,795,289 | A * | 1/1989 | Potemkin | B23D 77/00 |
| | | | | 407/62 |
| 4,826,364 | A * | 5/1989 | Grunsky | B23B 51/06 |
| | | | | 408/230 |
| 4,913,603 | A * | 4/1990 | Friedli | B23B 51/02 |
| | | | | 408/227 |
| 5,302,060 | A * | 4/1994 | Nystrom | B23B 27/1603 |
| | | | | 407/116 |
| 5,452,971 | A * | 9/1995 | Nevills | B23B 51/00 |
| | | | | 408/229 |
| 5,478,179 | A | 12/1995 | Kress et al. | |
| 5,921,728 | A * | 7/1999 | Kammeraad | B23D 77/00 |
| | | | | 408/227 |
| 8,419,322 | B2 | 4/2013 | Hodza et al. | |
| 9,073,130 | B2 * | 7/2015 | Kress | B23B 51/02 |
| 2003/0156912 | A1 * | 8/2003 | Ono | B23D 77/00 |
| | | | | 408/229 |
| 2006/0110227 | A1 * | 5/2006 | Kruszynski | B23B 27/141 |
| | | | | 408/230 |
| 2009/0053001 | A1 * | 2/2009 | Cohen | B23D 77/00 |
| | | | | 408/83 |
| 2009/0074527 | A1 * | 3/2009 | Kamizaki | B23B 51/02 |
| | | | | 408/230 |
| 2009/0110503 | A1 * | 4/2009 | Shaheen | B23D 77/00 |
| | | | | 408/239 R |
| 2010/0183384 | A1 | 7/2010 | Kruszynski et al. | |
| 2011/0103908 | A1 * | 5/2011 | Hobohm | B23D 77/00 |
| | | | | 408/224 |
| 2011/0116877 | A1 | 5/2011 | Hodza et al. | |
| 2012/0121352 | A1 * | 5/2012 | Ning | B23D 77/02 |
| | | | | 408/229 |
| 2013/0156520 | A1 | 6/2013 | Hacker et al. | |
| 2013/0307178 | A1 * | 11/2013 | Kress | B23B 51/009 |
| | | | | 264/156 |

FOREIGN PATENT DOCUMENTS

| | | | | |
|---|---|---|---|---|
| DE | 101 02 697 | A1 | 7/2002 | |
| DE | 203 19 341 | U1 | 6/2005 | |
| DE | 10 2006 028 729 | A1 | 12/2007 | |
| DE | 10 2008 027 945 | A1 | 12/2009 | |
| DE | 102008025961 | * | 12/2009 | ........... B23C 5/1081 |
| DE | 102009024256 | A1 * | 12/2010 | ......... B23B 51/0486 |
| DE | 10 2010 018 339 | A1 | 10/2011 | |
| EP | 1 561 535 | A1 | 8/2005 | |
| EP | 1 932 609 | A1 | 6/2008 | |
| JP | 56033214 | A * | 4/1981 | |
| JP | 03245914 | A * | 11/1991 | |
| JP | 2003-340646 | A | 12/2003 | |
| JP | 2013166232 | A * | 8/2013 | |
| SU | 517411 | A * | 6/1976 | ............ B23B 51/02 |
| WO | WO 2008/055489 | A2 | 5/2008 | |
| WO | WO 2010/015530 | A1 | 2/2010 | |

OTHER PUBLICATIONS

English translation of Notification of Transmittal of International Preliminary Report issued in Application No. PCT/EP2014/055286 dated Sep. 24, 2015 (1 page).
English translation of International Preliminary Report on Patentability issued in Application No. PCT/EP2014/055286 dated Sep. 24, 2015 (7 pages).
German Search Report issued in Application No. 10 2013 204 743.6 dated Dec. 4, 2013 (5 pages).
Notification Transmittal of International Preliminary Examination Report issued in Application No. PCT/EP2014/055286 dated May 11, 2015 (1 page).
International Preliminary Examination Report issued in Application No. PCT/EP2014/055286 dated May 11, 2015 (12 pages).
International Search Report with English translation issued in Application No. PCT/EP2014/055286, dated May 26, 2014 (6 pages).

\* cited by examiner

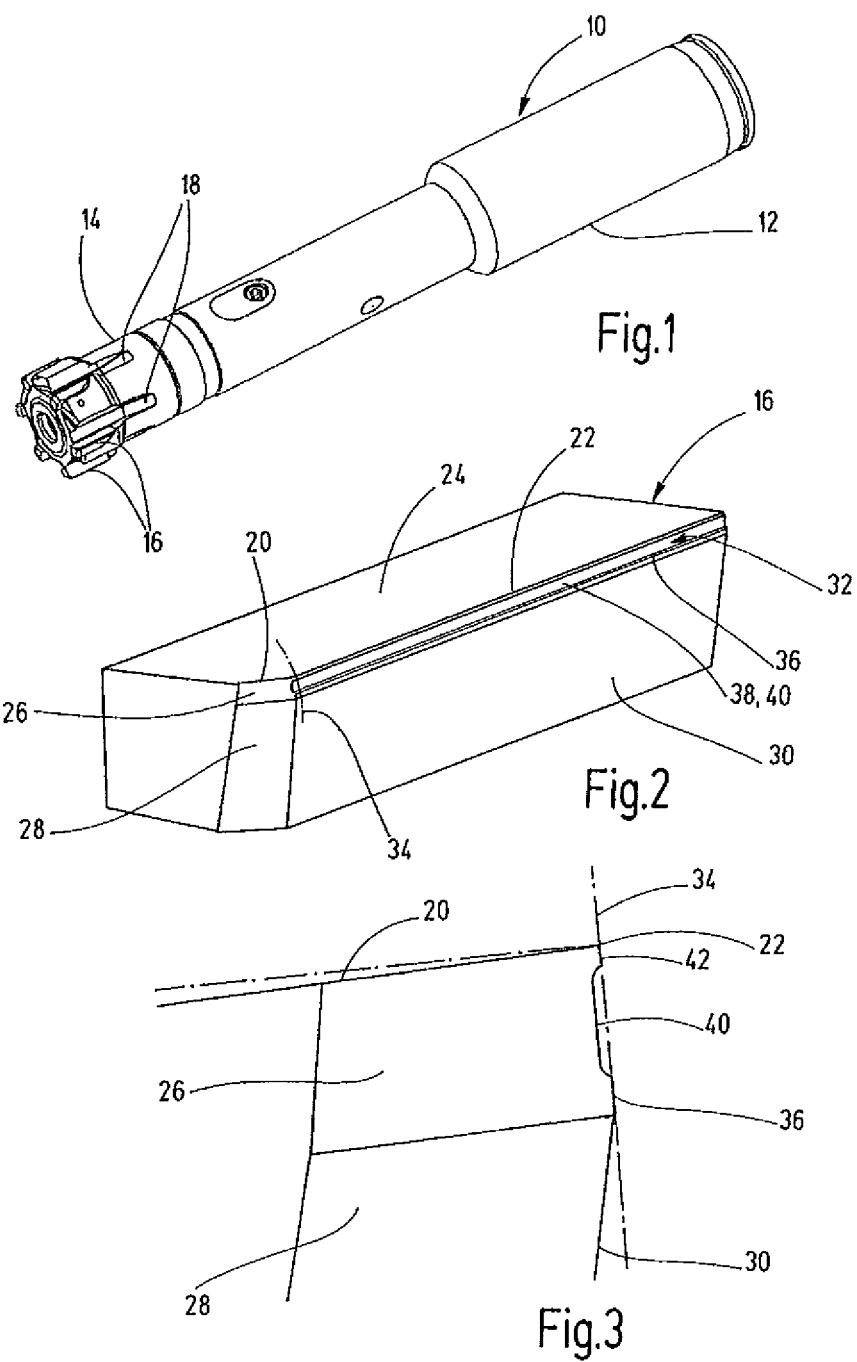

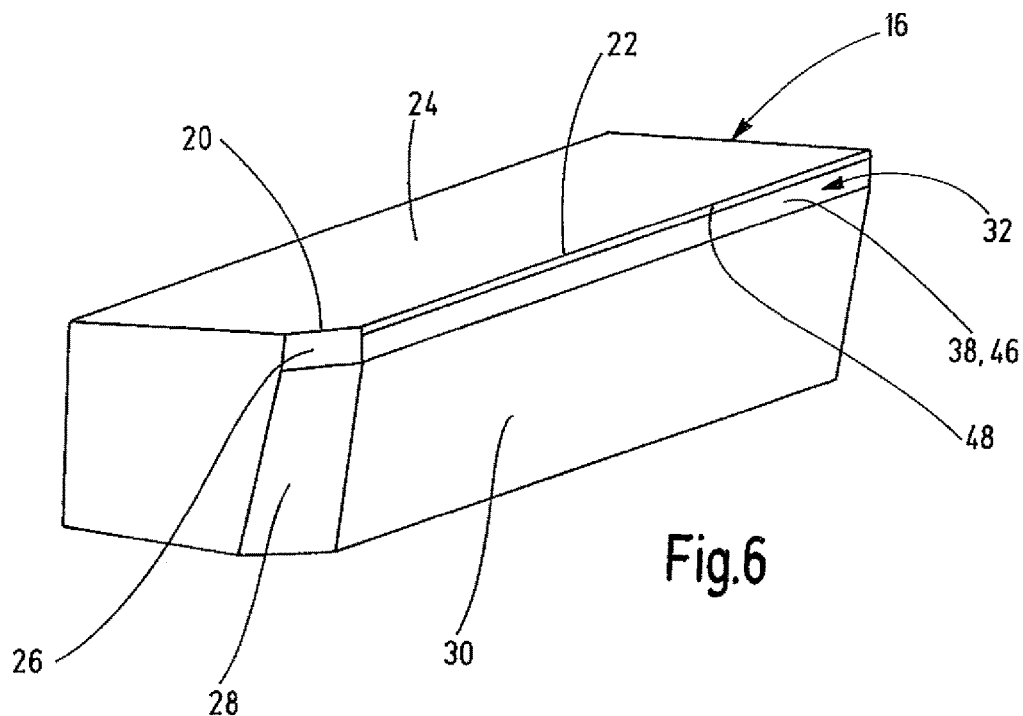
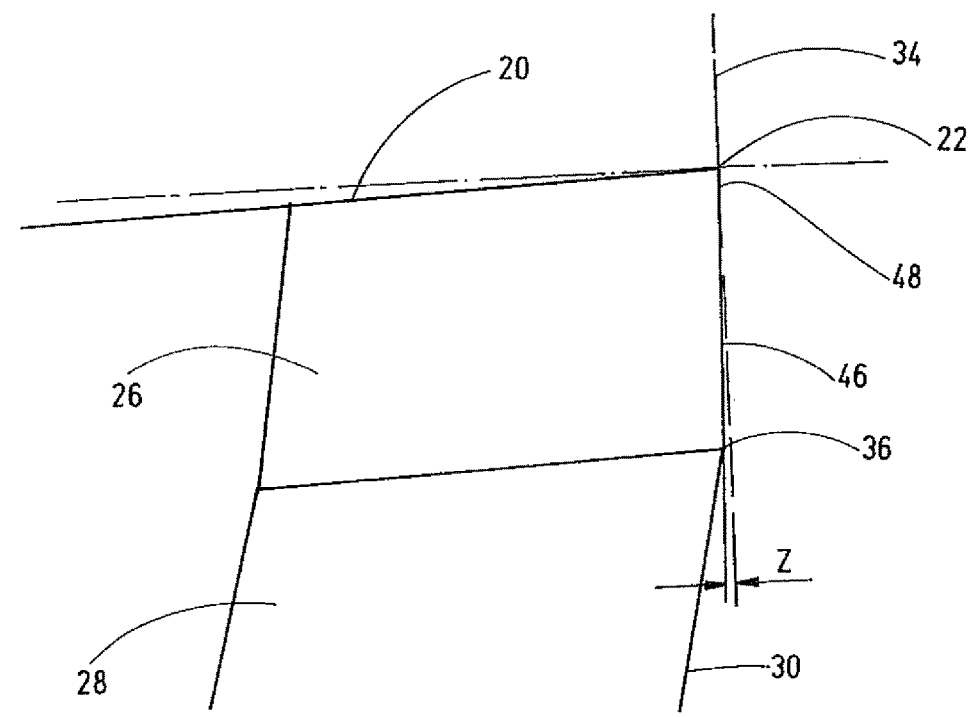

REAMING ELEMENT, REAMING TOOL AND METHOD FOR THE PRODUCTION THEREOF

The invention relates to a reaming element for a reaming tool, capable of being driven rotatingly about a rotational axis, for fine machining of a previously produced bore, comprising a frontal main cutting edge for the lead of a reaming allowance of the bore and a secondary cutting edge adjoining the radially outer end of the main cutting edge, wherein the main cutting edge and the secondary cutting edge delimit a cutting face, and a land, which forms a support zone for guidance on the bore wall, is configured between the secondary cutting edge and the rear flank thereof. The invention further relates to a reaming tool equipped with such reaming elements and to a method for manufacturing said reaming tool.

Reaming is a chip-forming machining method using a geometrically defined cutting edge, wherein, in contrast to drilling or boring, one works only with small chip cross-sections in always pre-machined bores. The machining allowances or reaming allowances in terms of the diameter lie typically within the range from 0.1 to 0.5 mm. A reaming tool is designed to ensure a high bore quality over many components, with the smallest possible tolerances in terms of the diameter, as well as in terms of the shape and position of the bore and the roughness thereof. In order to adhere to the dimensional accuracy of the bore within the range of a few micrometers, reaming tools are individually tailored to the machining task. This accuracy can generally be achieved by exactly defined grinding of cutting bodies or reaming elements fixedly connected to the main body of the tool. In this context, it is known to grind adjacent to the secondary cutting edge a circularly ground land, which rubs against the bore wall and, in so doing, performs a guidance and smoothing function. As a result of the friction force, heat is generated, however, and undesirable vibrations can ensue.

On this basis, the object of the invention is to further improve the reaming elements, as well as the reaming tools and methods for manufacturing the same, which are known from the prior art, and to ensure process-reliable machining while adhering to the high requirements pertaining to bore quality.

For the achievement of this object, that combination of features which is respectively defined in the independent patent claims is proposed. Advantageous embodiments and refinements of the invention emerge from the dependent claims.

The invention is based on the notion of, by structuring of the land, decoupling the cutting from the guidance and smoothing functions. Accordingly, it is proposed according to the invention that the support zone is smaller than the land and is kept, via an intermediate section of the land, at a lateral distance from the secondary cutting edge. In this way, the contact zone for an effective guidance and smoothing can be distanced further from the secondary cutting edge without increasing the area of engagement which is effective for the frictional heat. Rather, as a result of the intermediate section which is set back from the bore wall, a part of the land is rendered inactive, so to speak. Hence a process-reliable machining combined with close tolerances of the bore can be achieved, and a predefined surface quality, dimensional accuracy and dimensional constancy are ensured over a large number of bores or workpieces.

Advantageously, the land possesses, according to the basic shape, a circular arc contour tailored to the desired bore, wherein the intermediate section is shaped by material removal in the region of the circular arc contour.

A particularly preferred embodiment provides that the intermediate section is formed by a preferably groove-like recess between the secondary cutting edge and the support zone. In this way, on the mutually distanced flanks of the recess, the "cutting" and "smoothing/supporting" functions are able to be decoupled particularly effectively.

In this context, it is advantageous if the recess possesses a maximum depth of less than 10 µm.

A variant which is particularly advantageous for the machining of cast materials provides that the intermediate section ascends radially from the secondary cutting edge toward the support zone, so that the secondary cutting edge possesses a smaller pitch circle radius than the support zone. Here too, the support for the tool is shifted into a land region distanced from the secondary cutting edge. A further improvement can be obtained by virtue of the fact that the radial projection length of the support zone in relation to the secondary cutting edge is maximally 3 µm.

In order to effectively limit the generation of friction heat, it should in any event be ensured that the width of the support zone, measured in the peripheral direction, is between 0.05 and 0.75 mm, preferably between 0.05 and 0.15 mm.

A further variant, which is particularly advantageous for the machining of steel, provides that the intermediate section descends radially toward the support zone, so that the secondary cutting edge possesses a larger pitch circle radius than the support zone. The support section then becomes effective, above all, in the event of vibrations or motional deviations from the ideal bore geometry. In this case, it is favorable if the radial projection length of the secondary cutting edge in relation to the support zone is more than 0.01 mm.

Furthermore, it has proved particularly advantageous if the distance of the support zone from the secondary cutting edge, measured in the peripheral direction, is 0.005 to 0.05 times, advantageously 0.01 times, the outer pitch circle diameter of the main cutting edge.

The subject of the invention is also a reaming tool having a rotatingly drivable main body and a plurality of reaming elements according to the invention, distributed over the periphery of the main body, which are formed in one piece onto the main body or are fixedly connected, as an attachment, to the main body.

In the procedural respect, the object stated in the introduction is achieved by the sequence of at least the following method steps:
  circular grinding of the land on the basis of the bore radius,
  finish-grinding of the cutting face and of the rear flank,
  grinding of the main cutting edge or of the lead geometry,
  grinding-in of the intermediate section as a regional recess or bevel of the land, wherein the remaining circularly ground region of the land forms a support zone for the guidance on the bore wall.

The above-described advantages for the product of the method are thus achieved in the same way. In tool production, it is also possible for a plurality of reaming elements to be formed onto the periphery of a main body or to be firmly fixed in a respective seat.

BRIEF DESCRIPTION OF THE DRAWINGS

The invention is explained in greater detail below with reference to the illustrative embodiments represented schematically in the drawing, wherein:

FIG. 1 shows a reaming tool having a main body and thereto attached reaming elements in perspective representation;

FIG. 2 shows a first embodiment of a reaming element in perspective representation;

FIG. 3 shows a partially enlarged end face view in the direction of the secondary cutting edge of the reaming element according to FIG. 2;

FIG. 6 shows a third embodiment of a reaming element in perspective representation;

FIG. 7 shows a partially enlarged end face view in the direction of the secondary cutting edge of the reaming element according to FIG. 6.

Figure 4:
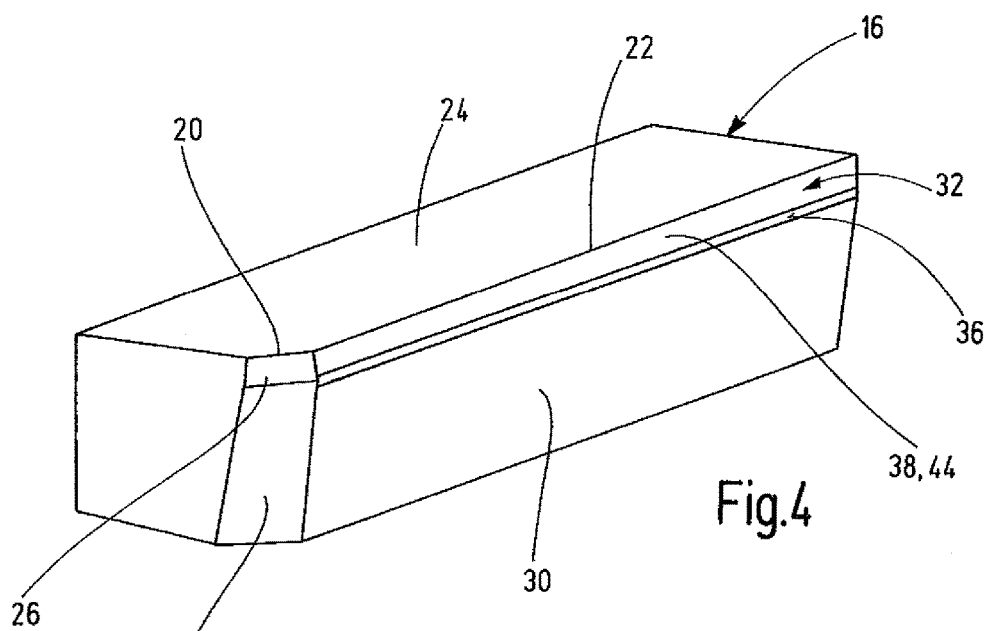
FIG. 4 shows a second embodiment of a reaming element in perspective representation.

The reaming tool 10 represented in FIG. 1 can be rotatingly driven about its longitudinal axis for the fine machining of a previously produced bore in a workpiece by means of a machine tool and can herein be advanced in the direction of the longitudinal axis in order to remove a reaming allowance by a metal-cutting process and thus produce a true-to-size bore having a high surface quality. For this purpose, the reaming tool 10 has a shank 12 clampable into a machine spindle, a main body 14 disposed at the front end of the shank 12, and a plurality of peripherally distributed reaming elements 16 soldered onto the main body 14. In front of the reaming elements 16 in the rotational direction, a chip flute 18 is respectively ground into the main body 14.

The elongated reaming elements 16 shown in various embodiments in FIGS. 2, 4, 6 possess on their front end face respectively a main cutting edge 20, and a secondary cutting edge 22 which adjoins the radially outer end of the main cutting edge 20 and converges with slight axial conicity, counter to the direction of advance, to the rotational axis. The course of the cutting edges forms an obtusely angled lead geometry in the transition of the main cutting edge 20 to the secondary cutting edge 22, wherein, in the course of the ream cutting, a central force, which forces the tool into the own middle, is generated. The main and secondary cutting edges 20, 22 delimit a cutting face 24 pointing in the rotational direction, which leads off the removed chips via the upstream chip flute 18. Adjoining the main cutting edge 20 at the rear, at different clearance angles, are a primary tool flank 26 and a secondary tool flank 28. For instance, the first clearance angle can amount to 8° and the second clearance angle 12°.

Between the secondary cutting edge 22 and the rear flank 30 thereof is configured a narrow land 32, which, according to the basic shape, has the contour of a circular or cylindrical grinding arc 34 and, in the various embodiments, is differently configured as a result of material removal. A support zone 36 for support against the inner wall of the bore to be machined is respectively formed, which support zone has a reduced surface area in comparison to the land 32 as a whole and is kept, by an intermediate section 38 of the land 32, at a lateral distance from the secondary cutting edge 22.

In the illustrative embodiment shown in FIGS. 2 and 3, the intermediate section 38 is formed by a groove-like recess 40. The recess 40 adjoins the secondary cutting edge 22 via a secondary cutting edge flank 42, and is delimited on the side remote from the secondary cutting edge 22 by the support zone 36. The narrow support zone 36 thus generates little friction on the bore wall and at the same time, due to the comparatively large distance to the secondary cutting edge 22, possesses good guidance characteristics. The maximum depth of the recess is less than 10 µm, for instance 7 µm. The width of the secondary cutting edge flank 42 lies expediently within the range between 0.01 mm and 0.02 mm, while the support zone 36, viewed likewise in the peripheral direction, possesses a width between 0.05 mm and 0.15 mm.

Advantageously, the width of the recess 40 is chosen such that the distance of the support zone 36 from the secondary cutting edge 22, measured in the peripheral direction, is 0.005-0.05 times, preferably 0.01 times, the outer pitch circle diameter of the main cutting edge 20.

Figure 5:
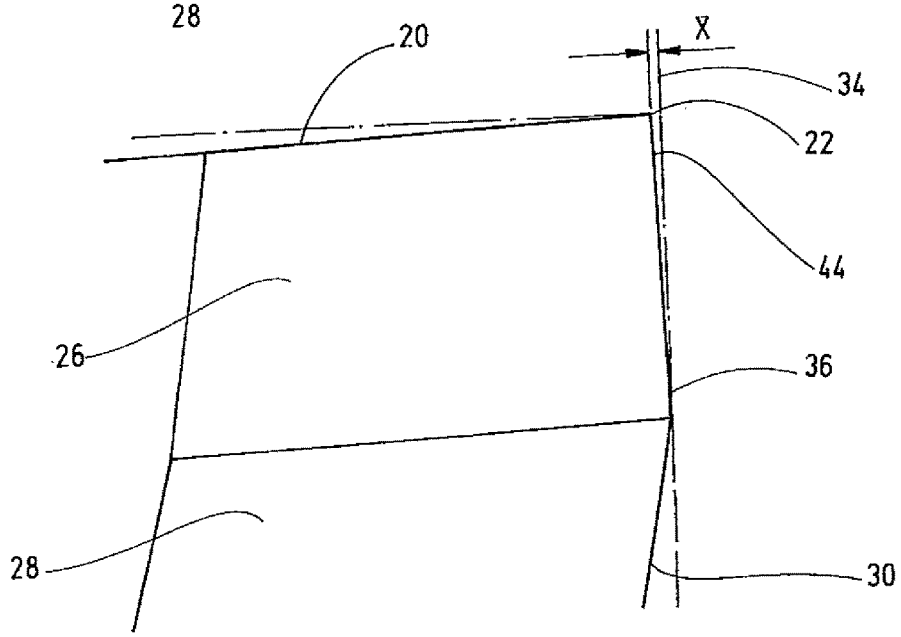
FIG. 5 shows a partially enlarged end face view in the direction of the secondary cutting edge of the reaming element according to FIG. 4.

The illustrative embodiment shown in FIGS. 4 and 5 is distinguished, above all, by virtue of the fact that the intermediate section 38 is formed by a setback 44 from the circular grinding arc 34 and thus ascends radially from the secondary cutting edge 22 toward the support zone 36. The secondary cutting edge 22 thus possesses a pitch circle which is smaller by the measure x (FIG. 5) than the support zone 36, wherein x is less than 3 µm, expediently 2.5 µm. In this way, a support region 36 which is set back from the secondary cutting edge 22 counter to the rotational direction and is reduced in width, for instance to 0.1 mm, is in turn created, in the contact zone of which the material of the bore wall is leveled or smoothed, while, at the same time, a guidance function is achieved. Advantageously, the width of the setback 44 is chosen here too such that the distance of the support zone 36 from the secondary cutting edge 22, measured in the peripheral direction, is 0.005 to 0.05 times, preferably 0.01 times, the outer pitch circle diameter of the main cutting edge 20.

In the third variant shown in FIGS. 5 and 6, the same or similar parts are once again provided with the same reference symbols as described above. In this illustrative embodiment, the intermediate section 38 descends as a flattening 46 radially toward the following support zone 36, so that the secondary cutting edge 22 possesses a pitch circle radius which is larger by the measure z than the support zone 36. The measure z should here be at least 0.01 mm. Directly adjacent to the secondary cutting edge 22, a circular grinding region 48 having a maximum width of 0.03 mm can be provided, while the adjoining flattening 46 should possess a width of maximally 0.2 mm. Thus the support zone 36, in purely geometric sectional representation, does not touch the bore wall, but rather shows its stabilizing worth only once vibrations and tool movements out of the bore axis arise. This is in particular the case in the machining of steel, in which less the smoothing of the bore, but rather the vibration damping by the support zone 36, is uppermost. Here the objective is also to obtain an improved stabilization effect by virtue of the increased distance of the support zone 36 from the secondary cutting edge 22, and to minimize the generation of friction heat by virtue of the reduced circular grinding region 48.

In the manufacture of the tool, after the reaming elements 16 have been soldered onto the main body 14, the land 32 is circularly ground in accordance with the desired bore diameter. A minimal axial conicity is here provided, so that the circular grinding diameter slightly declines counter to the direction of advance. After this, the chip flutes 18 are ground in and the cutting faces 24 and rear flanks 30 of the reaming elements 16 are finish-ground. A further method step comprises the grinding of the main cutting edge 20 or of the lead geometry, which is defined, in particular, by the lead angle, the rake angle and the primary and secondary clearance angles. In the subsequent grinding in of the intermediate section 38, a regional recess 40 or bevel 44, 46 of the land 32 is produced, wherein the remaining region of the land forms a support zone 36 for the guidance on the bore wall. Of course, additional machining steps such as coating or cleaning may possibly be necessary in order to complete the manufacture of the tool.

The invention claimed is:

1. A reaming element for a reaming tool, capable of being driven rotatingly about a rotational axis, for fine machining of a previously produced bore, comprising a frontal main cutting edge and a secondary cutting edge directly adjacent to and extending from a radially outer end of the main cutting edge, wherein the main cutting edge and the secondary cutting edge delimit a cutting face, and a ground land, which forms a support zone for guidance on a wall of the bore is configured between the secondary cutting edge and a rear flank of the reaming element, characterized in that the support zone is smaller in area than the land and is spaced, by an intermediate section of the land, at a distance from the secondary cutting edge, the intermediate section is formed by a grooved recess between the secondary cutting edge and the support zone, the distance of the support zone from the secondary cutting edge, measured in a peripheral direction from an outer peripheral surface of the reaming tool in a rotational direction, is 0.005 to 0.05 times an outer pitch circle diameter of the main cutting edge and the width of the support zone, measured in the peripheral direction, is between 0.05 and 0.75 mm.

2. The reaming element as claimed in claim 1, characterized in that the land has a circular arc contour and the intermediate section contacts material removed in the region of the circular arc contour.

3. The reaming element as claimed in claim 1, characterized in that the recess possesses a maximum depth of less than 10 μm.

4. The reaming element as claimed in claim 1, characterized in that the width of the support zone, measured in the peripheral direction, is between 0.05 and 0.15 mm.

5. The reaming element as claimed in claim 1, characterized in that the distance of the support zone from the secondary cutting edge, measured in the peripheral direction, is 0.01 times the outer pitch circle diameter of the main cutting edge.

6. A reaming tool having a rotatingly drivable main body and a plurality of the reaming elements as claimed in claim 1, distributed over the periphery of the main body, wherein the reaming elements are formed in one piece onto the main body or are fixedly connected, as an attachment, to the main body.

* * * * *